United States Patent [19]
Migliavacca

[11] Patent Number: 5,920,182
[45] Date of Patent: Jul. 6, 1999

[54] "RESET" TYPE POWER SUPPLY VOLTAGE MONITORING DEVICE

[75] Inventor: Paolo Migliavacca, Sassenage, France

[73] Assignee: STMicroelectronics S.A., Gentilly, France

[21] Appl. No.: 09/129,145

[22] Filed: Aug. 5, 1998

[30] Foreign Application Priority Data

Aug. 21, 1997 [FR] France .................................. 97 10551

[51] Int. Cl.$^6$ .................................................. G05F 1/565
[52] U.S. Cl. ........................................................ 323/282
[58] Field of Search ...................... 323/223, 226, 323/265, 266, 271, 273, 274, 282, 284

[56] References Cited

U.S. PATENT DOCUMENTS

| | | | |
|---|---|---|---|
| 4,862,013 | 8/1989 | Konopka | 307/254 |
| 4,929,883 | 5/1990 | Chieli | 323/282 |
| 5,224,010 | 6/1993 | Tran et al. | |
| 5,477,176 | 12/1995 | Chang et al. | |
| 5,818,214 | 10/1998 | Pelly et al. | 323/282 |

OTHER PUBLICATIONS

E. Haseloff, "TL7700 Voltage Supervisor," Microprocessors & Microsystems, vol. 11, No. 10, Dec. 1987, pp. 545–548.
R. Benzer, "What To Do When the Power Goes Out," Machine Design, vol. 63, No. 7, Apr. 11, 1991. pp. 62–63.

Primary Examiner—Matthew Nguyen
Attorney, Agent, or Firm—Allen, Dyer, Doppelt, Milbrath & Gilchrist, P.A.

[57] ABSTRACT

A power supply voltage monitoring device includes a constant voltage generator, a comparator to compare the power supply voltage with a reference voltage output by the constant voltage generator and to control the state of an output terminal. The device also comprises a delay circuit to put the output terminal into a predetermined state (low) for a predetermined duration exceeding the duration of the transient conditions, while the voltage generator is being put into operation. The power supply voltage monitoring device may typically be applied in microprocessor equipment.

27 Claims, 5 Drawing Sheets

"RESET" TYPE POWER SUPPLY VOLTAGE MONITORING DEVICE

FIELD OF THE INVENTION

This invention relates to power supplies and associated circuits, and, more particularly, to a "reset" type power supply voltage monitoring device of a type usually used to monitor and control the power supply of microprocessors or equipment comprising microprocessors, such as computers.

BACKGROUND OF THE INVENTION

Microprocessors are usually designed to operate at a nominal voltage of, for example, about 5 volts. They may operate satisfactorily at voltages of less than 5 volts, as long as the supply voltage exceeds a threshold voltage on the order of 4.5 volts. In particular, below the threshold voltage compatibility problems occur between the microprocessor and the peripheral devices connected to it. Peripheral devices are equipment such as serial/parallel interfaces, printers, display units or the A/D, D/A (Analog/Digital, Digital/Analog) converters which are associated with microprocessors.

When the power supply voltage returns to its nominal value after dropping below the threshold voltage, the microprocessor must carry out an internal reconfiguration which corresponds to placing it into an initialization state before placing it back into communication with its peripheral equipment. This return to an initialization state is also called "reset".

A "reset" type power supply voltage monitoring device outputs information indicating that the power supply voltage has changed and gone below or above the threshold voltage. This information may be supplied to a monitoring system external to the microprocessor, or to the microprocessor itself. Such a reset type power supply monitoring circuit may be used in equipment or machines using one or several microprocessors, for example, such as microcomputers.

Figure 1:
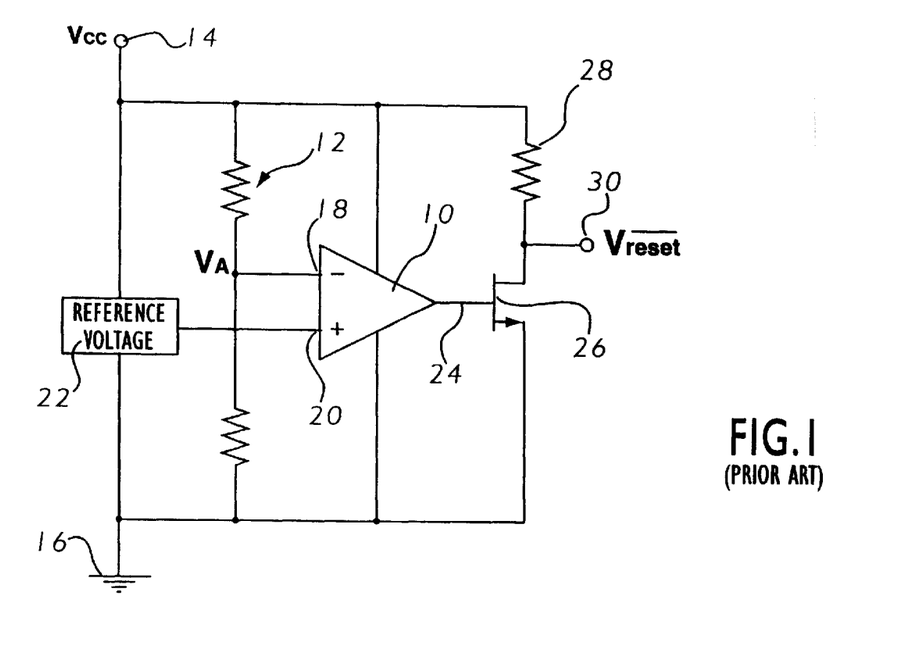
FIG. 1, already described, is a simplified circuit of a known type of power supply voltage monitoring device.

FIG. 1 schematically shows a known type of power supply voltage monitoring device. The device is based primarily upon a comparator 10. A resistance bridge 12, connected between a power supply terminal 14 at the power supply voltage $V_{CC}$, and a ground terminal 16, applies a voltage denoted $V_A$ proportional to the power supply voltage $V_{CC}$ to a first input (inverting) 18 of the comparator. A second (non-inverting) input 20 of the comparator 10 is connected to a reference voltage generator 22 shown schematically.

Note that the reference voltage generator, also connected between the power supply terminal 14 and the ground terminal 16 is capable of outputting a constant voltage with value, denoted $V_{GAP}$, on the order of 1.2 volts, and is practically unaffected by ambient temperature variations.

A comparator output 24 is connected to the gate of a MOS (Metal Oxide Semiconductor) type output transistor 26. The output transistor 26 is connected in series with a load resistor 28 between the power supply terminals 14 and the ground terminal 16. The load resistor 28 connects the transistor drain to the power supply terminal 14 at the voltage $V_{CC}$.

The output terminal of the monitoring device located between the output transistor drain and the load resistor is identified by reference 30. This output terminal, the voltage of which is denoted $V_{\overline{reset}}$ is in a high state ($V_{\overline{reset}} \approx V_{CC}$) when the power supply voltage $V_{CC}$ exceeds a voltage threshold denoted $V_{th}$ and changes to a low state ($V_{\overline{reset}} \approx 0V$) whenever the power supply voltage $V_{CC}$ becomes less than the threshold voltage $V_{th}$.

The threshold voltage may be adjusted by modifying the value of the reference voltage output by the reference voltage generator 22 and/or by adjusting the values of the resistors forming the resistance bridge 12 to modify the voltage $V_A$. Preferably, the threshold voltage $V_{th}$ is adjusted so that it is approximately equal to the operating threshold voltage of a microprocessor with which the monitoring device is used.

Figure 2:
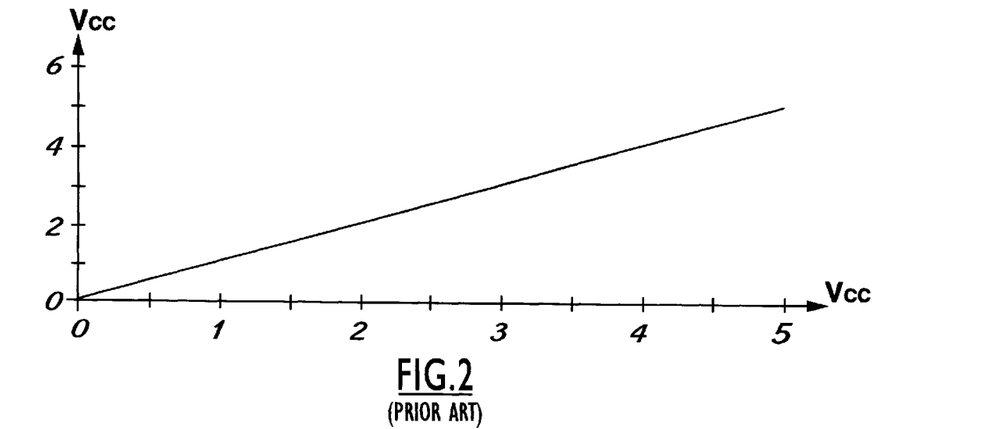
FIGS. 2 to 4 are graphs illustrating static operation of the prior art device in FIG. 1 as a function of the power supply voltage applied to it.

The static operation of the device is explained with reference to FIGS. 2 to 4. FIG. 2 is a reference graph showing the power supply voltage expressed in volts on the abscissa and on the ordinate. The voltage increases very slowly from a value of 0 volts to a value of $V_{CC}=5$ volts.

Figure 3:
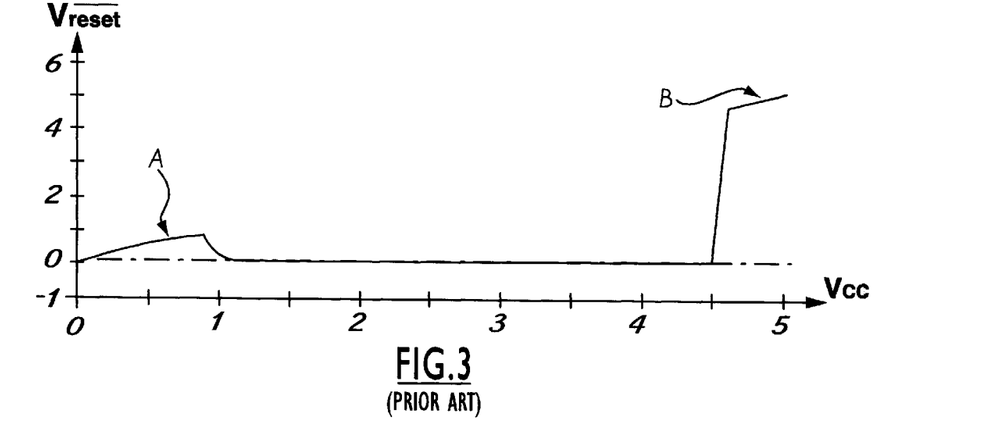
Figure 4:
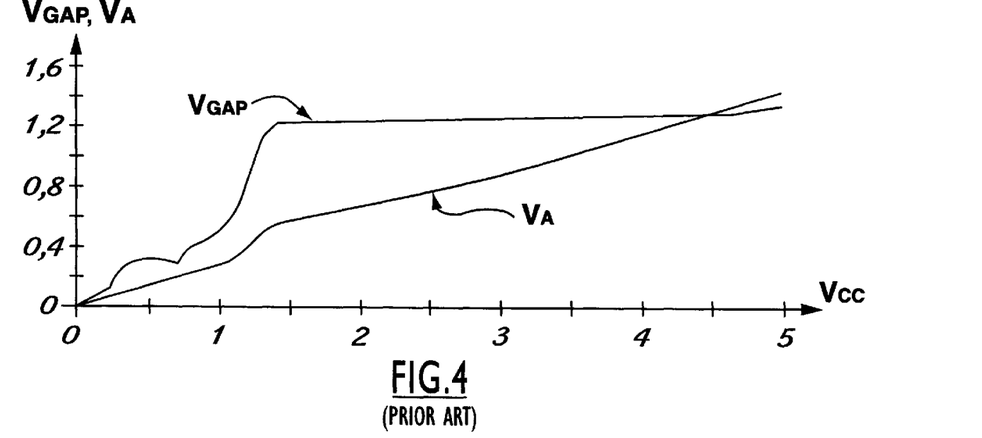

FIG. 3 is a graph expressing the output voltage $V_{\overline{reset}}$ of the output terminal 30 (the ordinate) as a function of the power supply voltage(the abscissa). Finally, FIG. 4 is a graph showing the value of the voltage $V_A$ of the resistance bridge and the voltage $V_{GAP}$ of the reference voltage generator, as a function of the power supply voltage $V_{CC}$.

FIG. 3 shows that the output voltage $V_{\overline{reset}}$ on the output terminal increases linearly with the power supply voltage and is approximately equal to the power supply voltage up to $V_{CC}=V_{\overline{reset}} \approx$ about 0.9 V.

When the power supply voltage is less than about 0.9, the output transistor switching threshold is not reached. The transistor is thus blocked and the output voltage "follows" the power supply voltage. This phenomenon, marked by the letter A in FIG. 3, is not harmful to the extent that an output voltage of less than 1 volt is considered to be a low state of the monitoring device. Furthermore, FIG. 4 shows that the voltage $V_{GAP}$ of the reference voltage generator reaches a stable value on the order of 1.2 volts starting from a power supply voltage $V_{CC}$ greater than or equal to about 1.5 volts.

The voltage $V_A$ output by the resistance bridge 12 is proportional to the power supply voltage $V_{CC}$. When the voltage $V_A$ is less than the reference voltage $V_{GAP}$, the comparator output is in a high state and the output transistor is conducting. Thus, the output voltage $V_{\overline{reset}}$ is approximately equal to the voltage of the ground terminal 16, in this case 0 volts. Then starting from a power supply voltage $V_{CC}$ of 4.5 volts, which in this case is the threshold voltage, the voltage $V_A$ becomes greater than the reference voltage $V_{GAP}$.

The comparator output 24 thus changes to a low state and blocks the output transistor which thus behaves practically like an open switch. The output voltage then changes rapidly to a high state, such that $V_{\overline{reset}}=V_{CC}$. This phenomenon is shown by the letter B in FIG. 3.

Figure 5:
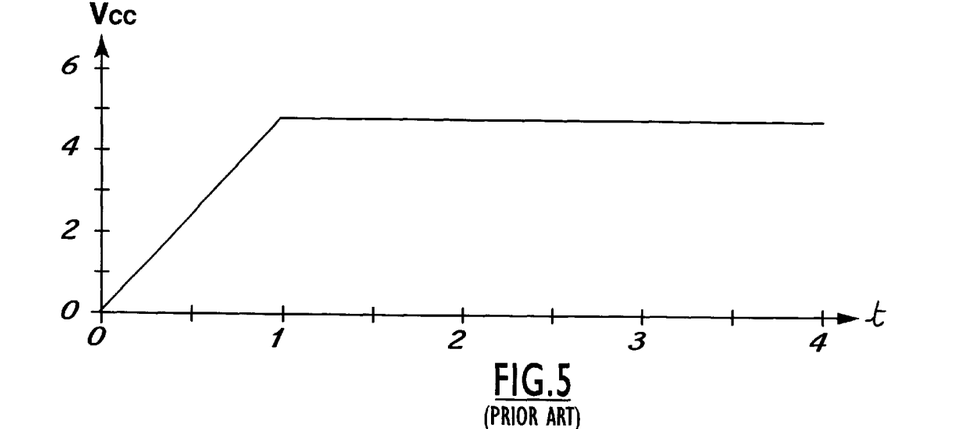
FIGS. 5 to 7 are graphs illustrating the dynamic behavior of the prior art device in FIG. 1 when power is applied to it.
Figure 6:
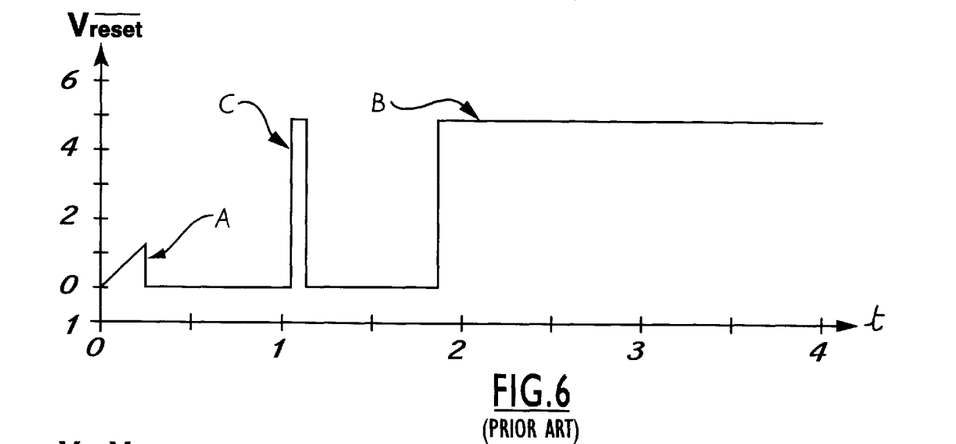
Figure 7:
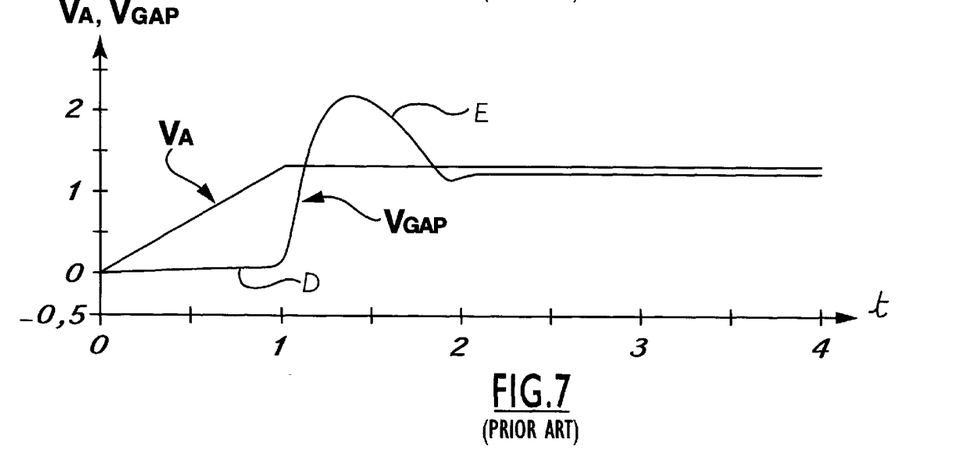

We will now describe FIGS. 5, 6 and 7 which illustrate the dynamic behavior of the device in FIG. 1. FIG. 5 shows the value of the power supply voltage $V_{CC}$ on the ordinate, as a function of the time shown on the abscissa and expressed in units of $10^{-4}$ sec. Time is counted starting from when the device is switched on. It can be seen that the power supply voltage increases from 0 volts to a voltage close to 5 volts during a period of 100 μsec, and then remains at this value.

FIG. 6 shows the behavior of the output voltage $V_{\overline{reset}}$, as a function of time. The voltage is shown on the ordinate and is expressed in volts. The time shown on the abscissa starts when power is switched on and is expressed in $10^{-4}$ sec. Initially, and until values of the power supply voltage reach the order of 1 volt, the output voltage follows the power supply voltage. This phenomenon, shown by the letter A, is explained above and is not discussed again.

Starting from 190 μsec, the output voltage $V_{\overline{reset}}$ changes to the high state (about 5 volts) (reference letter B). Thus there is a delay of about 90 μsec between the power supply voltage and the response of the device going into the high state. This delay is not harmful to correct operation of the power supply voltage monitoring device, since it delays the supplied information very little.

However another phenomenon, marked with letter C in FIG. 6, is a particular nuisance. When the power supply voltage $V_{CC}$ has reached its nominal value of 5 volts, the device output voltage changes to the high state for a brief period, 10 μsec, and then returns to its low state, before finally switching to the high state (at B).

This transient phenomenon is a nuisance especially to the extent that it introduces a doubt about the true state of the power supply voltage. The explanation of this phenomenon is given with reference to FIG. 7.

FIG. 7 is a graph which shows the voltage $V_A$ of the resistance bridge on the ordinate, and the voltage $V_{GAP}$ of the reference voltage generator as a function of time, on the abscissa. The scales are identical to the scales in the previous Figures.

It is found that the voltage $V_A$ output by the resistance bridge varies proportionally with the power supply voltage. However, the voltage $V_{GAP}$ increases with a delay after the power supply voltage. This delay is shown as reference D. Then, after the delay, the voltage $V_{GAP}$ increases rapidly and exceeds the voltage $V_A$. This phenomenon, marked by reference E, represents an over-oscillation related to a transient condition when the constant voltage generator starts operating. The over-oscillation lasts for a few tens of microseconds.

By comparing FIGS. 6 and 7, the following operation described as a function of time is observed starting from the instant zero when power is switched on. Until a time of 100 μsec, the power supply voltage is too low and the comparator 10 (FIG. 1) does not work. The output 30 is in a low state. Starting from a time of 105 μsec, the comparator 10 operates and it is observed that $V_A > V_{GAP}$. Its output changes to a low state and the output terminal 30 of the device changes to a high state $V_{\overline{reset}} \approx V_{CC}$.

Then during the over-oscillation (115 μsec), the voltage $V_{GAP}$ increases until it becomes greater than $V_A$. The output of the comparator 10 changes to a high state and the device output terminal 30 changes to a low state $V_{\overline{reset}} \approx 0V$. This low state of the output terminal does not represent the state of the power supply voltage which has reached its nominal value.

Finally, after a time of 190 μsec, the over-oscillation is finished and the voltage $V_A$ is once again (slightly) greater than $V_{GAP}$. The output terminal 30 is then in a high state. It appears that the over-oscillation of the constant voltage generator under dynamic conditions, and its operating delay, are essentially the cause of incorrect behavior of the power supply voltage monitoring device.

SUMMARY OF THE INVENTION

The purpose of this invention is to provide a power supply voltage monitoring device that does not have the problem mentioned above.

In particular, one purpose is to provide this type of device in which the output state is not unstable during a transient period after the power supply voltage has been started.

Another purpose is to provide such a device which is simple and economic to make, and suitable for integration on an electronic chip.

More precisely, to achieve these ends, the present invention is directed to a "reset" type power supply voltage monitoring device comprising a constant voltage generator, and a comparator to compare the power supply voltage with a reference voltage output by the constant voltage generator, and to control the state of an output terminal of the monitoring device. The device according to the invention also comprises a delay circuit to put the output terminal into a predetermined state (low) for a predetermined duration after the device is switched on. The predetermined duration exceeds the transient start-up time of the constant voltage generator.

In accordance with the inventor, when the power supply is switched on, the output terminal remains in a predetermined state, in fact in the low state, for a sufficient period to guarantee that the output is insensitive to any over-oscillations or transient phenomena that could disturb the given information. After the waiting period has elapsed, all components of the monitoring device have reached their normal operating conditions and the state of the output terminal (high or low) correctly reflects the value of the power supply voltage, which is greater than or less than a given threshold value.

For example, the constant voltage generator could be a "band-gap" type generator. A "band-gap" type generator is a generator that uses the fact that the voltage at the terminals of a semiconductor junction depends on the temperature, this voltage being a function of the prohibited band (band-gap) of the semiconductor(s) considered. For example, reference may be made to the EDN document, Jan. 18, 1990, pages 120–128.

According to one specific embodiment of the device, the delay circuit may comprise a capacitor associated with a switching transistor. The switching transistor is preferably capable of being in a blocked state when the capacitor charge voltage reaches a predetermined value. In this case, the waiting period is determined by the time necessary for the capacitor to charge up to the predetermined value. For example, the switching transistor may be controlled by an inverting switch that connects the transistor gate to the charging capacitor.

According to another specific aspect of the invention, the constant voltage generator could be a generator associated with a current source or operating with a current source. In this case, a current mirror is provided to copy the current from the current source to a capacitor charging circuit.

BRIEF DESCRIPTION OF THE DRAWINGS

Other characteristics and advantages of the invention will be more easily understood from the following description with reference to the attached Figures. This description is given for illustration purposes only and is in no way restrictive.

DETAILED DESCRIPTION OF THE PREFERRED EMBODIMENTS

The elements of FIG. 8, described below, which are identical, similar or equivalent to the corresponding elements in FIG. 1, are identified with the same references plus 100. The voltage monitoring device in FIG. 8 comprises a comparator 110, in which the first input 118 of the inverting type is connected to a resistance bridge 112, and the second input 120 of the non-inverting type is connected to a band-gap type constant voltage generator 150.

The resistance bridge comprises two resistors in a voltage dividing circuit. They connect the first input of the comparator 110 to a power supply terminal 114 and a ground terminal 116, respectively. Thus the voltage applied to the first comparator input, denoted $V_A$, reflects the power supply voltage $V_{CC}$ to which it is proportional and with which it varies linearly.

The constant voltage generator, for which an example embodiment is described in detail later, is associated with a current source shown schematically as reference 151. One comparator output 124 is connected to the gate of an output transistor 126 through a first inverting switch 152 and a second inverting switch 154 connected in series.

The MOS type output transistor 126 is connected in series with a load resistor 128 in an output leg. The load resistor 128 connects the drain of the output transistor 126 to the positive power supply terminal 114 at voltage $V_{CC}$, whereas the source is connected to the ground terminal 116. The output terminal of the device corresponds to the transistor drain and is shown as reference 130.

Figure 8:
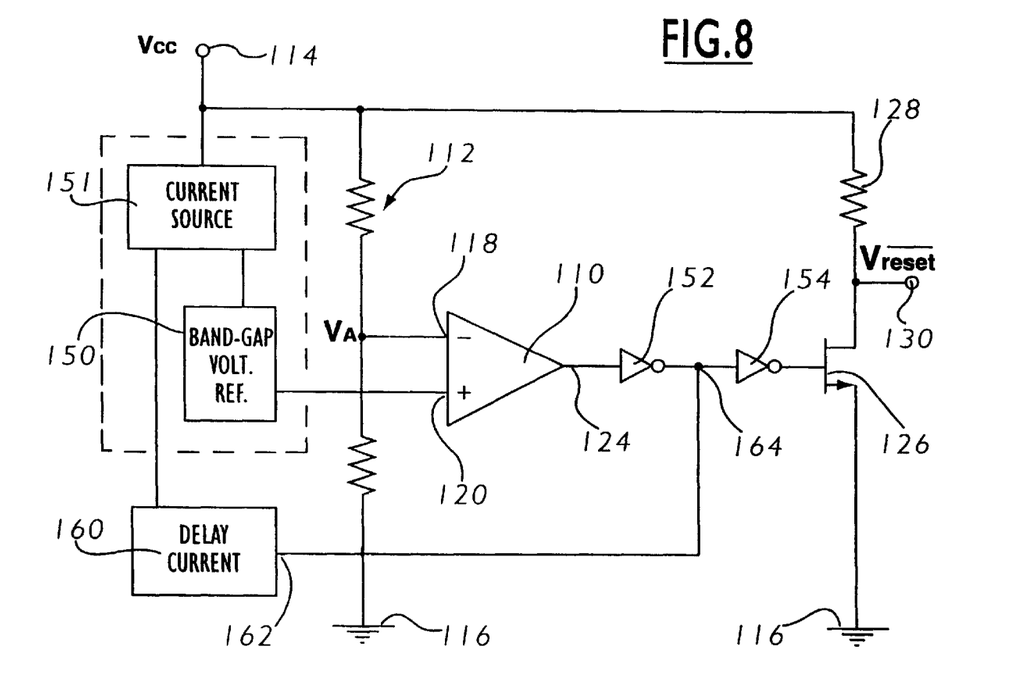
FIG. 8 is a block diagram of the device according to the invention.

The device in FIG. 8 according to the invention includes a delay circuit 160, the output 162 of which is connected to a node 164 located between the first and second inverters 152 and 154. It is also seen that the delay circuit 160 is connected to the current source. The delay circuit 160 is designed to force the comparator output, and more precisely the node 164 between the first and second inverters 152, 154 to a voltage state such that the output terminal 130 is in a predetermined state, such as the low state, for a predetermined duration starting from when power is switched on.

Figure 9:
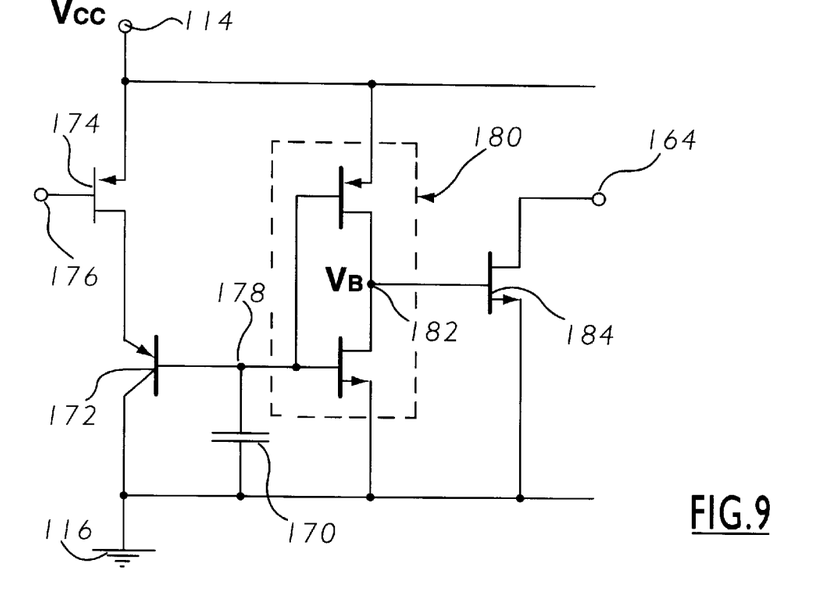
FIG. 9 is an electrical circuit of a specific embodiment of a delay circuit that can be used for the device according to the invention.

FIG. 9 shows a representative embodiment of the delay circuit. The delay circuit is based upon a capacitor 170 connected between the base and the collector of a charge control transistor 172. The collector of this transistor is connected to the ground terminal 116 and its emitter is connected to the power supply terminal 114 through a MOS transistor 174, called the mirror. This transistor forms part of a current mirror and its gate 176 is connected to the current source 151 to copy the current from the current source to the emitter of the charge control transistor 172.

A terminal 178 on capacitor 170 is connected to the base of the charge control transistor 172 and is also connected to the gates of the two field-effect transistors mounted in series between the power supply terminal 114 and the ground terminal 116 in an inverter circuit 180. A node 182 corresponding to the drains of the transistors in the inverter 180, is connected to the gate of a switching transistor 184. The source of the switching transistor 184 is connected to the ground terminal 116 and the drain is connected to node 164 that can be seen in FIG. 8. The gate voltage of the switching transistor is denoted as $V_B$ in the remainder of this text.

Figure 10:
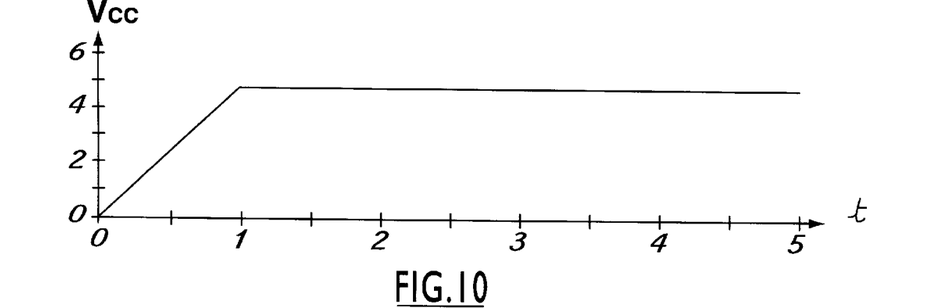
FIGS. 10 to 13 are graphs showing the behavior of a device according to FIG. 8 when it is switched on. On these graphs, the voltages marked on the ordinate are expressed in volts, and the time elapsed since switching on is expressed in $10^{-4}$ sec.

The operation of the device and the delay circuit is described with reference to FIGS. 10 to 13. FIG. 10 is a graph showing the power supply voltage $V_{CC}$ on the ordinate, as a function of the time elapsed since the device was switched on, shown on the abscissa. The voltage is expressed in volts, and the time is expressed in $10^{-4}$ sec. It can be seen that starting from when power is switched on, the power supply voltage increases linearly until it reaches its nominal value on the order of 5 volts, after a time of 100 μsec.

Figure 11:
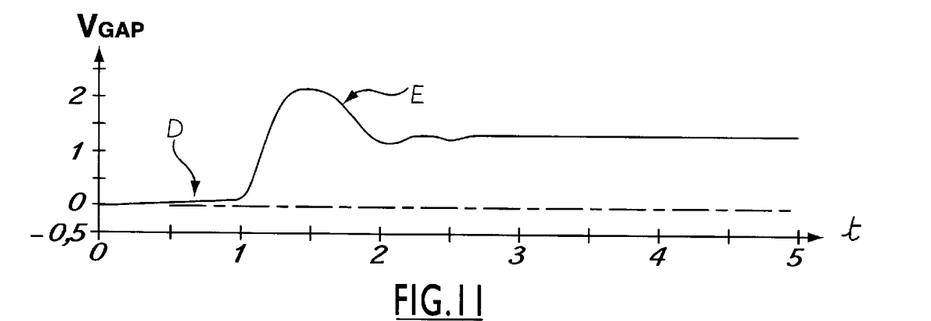

FIG. 11 is a graph that shows the voltage output by the constant voltage generator as a function of time, on the ordinate. This Figure clearly shows that the voltage of the constant voltage generator denoted $V_{GAP}$, increases with a delay of about 100 μsec after the power supply voltage, then over-oscillates and finally stabilizes at a set value $V_{GAP}$ on the order of 1.2 volts, after about 250 μsec. In the same way as in FIG. 4, already described, the voltage set up delay and the over-oscillation of the constant voltage generating device are identified with the letters D and E in FIG. 11.

Figure 12:
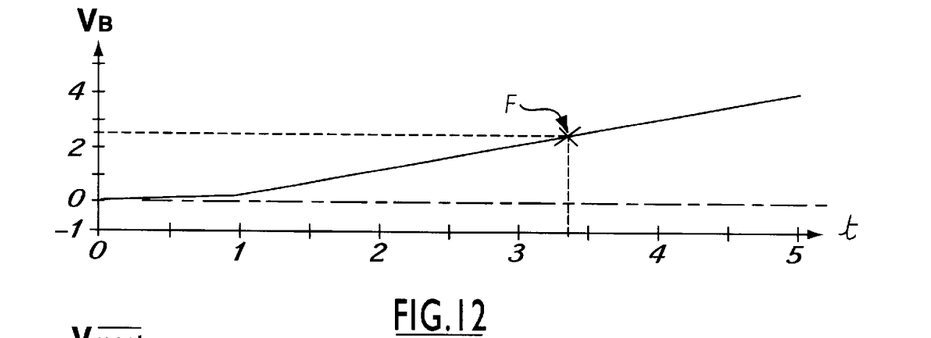

FIG. 12 is a graph showing the variation with time of the voltage $V_B$ measured on the gate of the switching transistor 184 in FIG. 9. After a delay on the order of 100 μsec after the initial power on time, the voltage $V_B$ increases as the capacitor charge 170 increases (FIG. 9). The observed delay corresponds to the time taken by the power supply voltage to reach a sufficiently high value for the current source to start operation.

A point marked F in FIG. 12 shows a "switching" voltage on the order of 2.5 volts, corresponding to the blocking voltage of the switching transistor 184 (FIG. 9). For gate voltages $V_B$ less than this value, the switching transistor is in a conducting state and forces node 164 on the device in FIG. 8 to the ground voltage (0 volt). In this case, the output terminal 130 is forced to the low state.

When the voltage $V_B$ reaches and exceeds the switching voltage corresponding to point F, the switching transistor is in a blocked state and "isolates" the comparator output from the delay circuit. The state of the output terminal 130 is always dictated by the state of the output 124 of comparator 110 (see FIG. 8).

Figure 13:
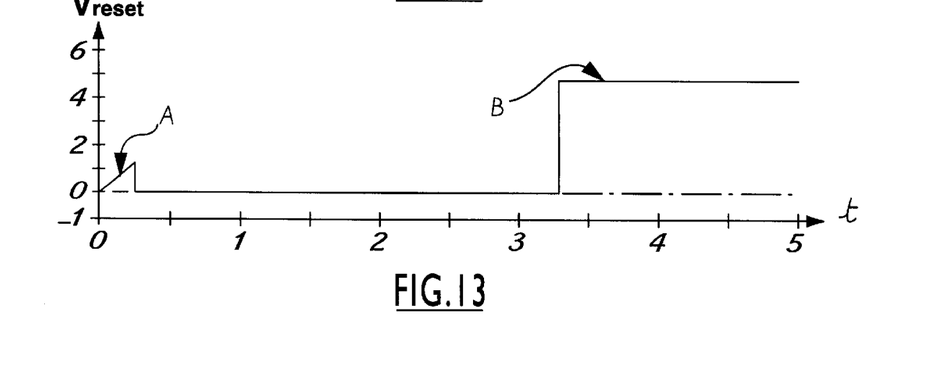

FIG. 13 is a graph showing the voltage available on the output terminal 130, denoted $V_{\overline{reset}}$, as a function of time and starting from when power is switched on. It is observed that initially the voltage $V_{\overline{reset}}$ on the output terminal "follows" the power supply voltage until the power supply voltage reaches about 1 volt. This phenomenon, already described with reference to FIGS. 3 and 6, is marked by letter A. It corresponds to an operating delay of the output transistor because the power supply voltage is too low.

The value of the output voltage $V_{\overline{reset}}$ is then low and is on the order of 0 volts for about 330 μsec. During this period, during which a transient over-oscillation phenomenon of the constant voltage generator occurs, the output 130 is forced to the low state by means of the delay circuit. Then starting from 330 μsec, which corresponds to point F in FIG. 12, the output terminal, controlled by comparator 110 (FIG. 8) changes to the high state (reference B), since the voltage $V_A$ on the first input of the comparator exceeds the voltage $V_{GAP}$ of the second input. Comparing FIGS. 12 and 6, the lack of any parasitic switching (reference C, FIG. 6) due to transient phenomena (over-oscillation) is observed in FIG. 12.

Figure 14:
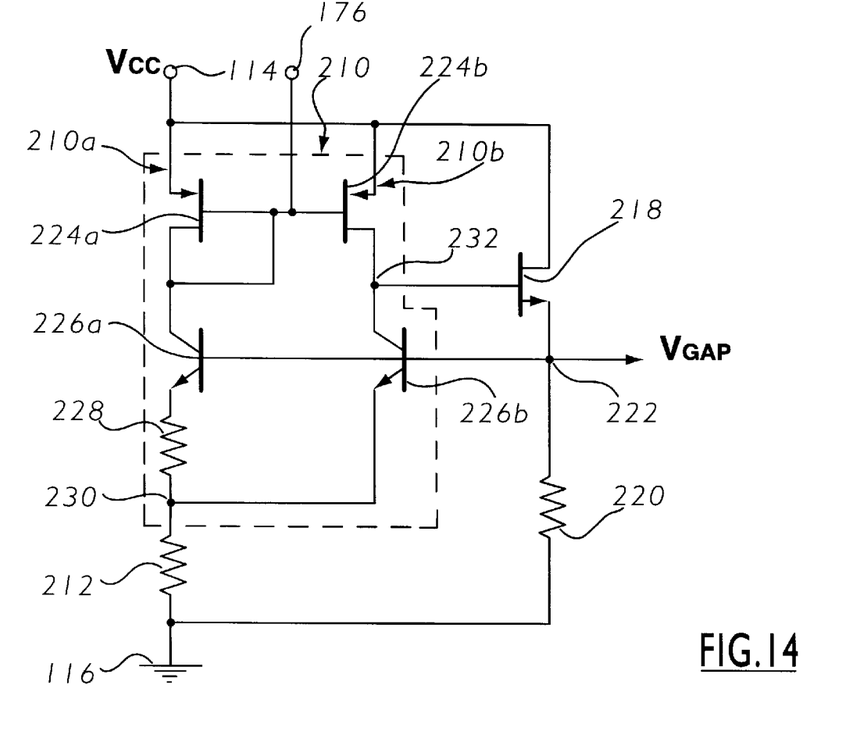
FIG. 14 shows an electrical circuit for a particular embodiment of a constant voltage generator with current source, usable for the device according to the invention.

For further information, one possible embodiment of the constant voltage generator and the current source is now described with reference to FIG. 14. The constant voltage generator in FIG. 14 is associated with a current source 210. The current source 210 is connected in series with a resistor 212, called the adjustment resistor, between a positive power supply terminal 214 and a ground terminal 216. An output follower transistor 208, electrically connected (through its gate) to a leg of the current source 210, is connected in series with a resistor 220, called the load resistor, between power supply terminals 114 and 116.

The constant voltage output by the device and denoted $V_{GAP}$ is available between the ground terminal 116 and an output node 222 corresponding to the source of the output transistor 218. In other words, the voltage $V_{GAP}$ is available at the terminals of the load resistor 220.

The current source comprises a first leg 210a with a first transistor 224a called the mirror transistor, in series with a second transistor 226a of the npn bipolar type, and a resistor 228 called the emitter resistor. The emitter resistor connects the emitter of the bipolar transistor 226a to a node 230. Furthermore, node 230 is connected to the ground terminal 116 through the adjusting resistor 212. The first leg 210a is also called the pilot leg of the current source.

A second leg 210b is connected in parallel to the first branch 210a between the positive power supply terminal 214 and node 230. It comprises a first transistor 224b called the mirror, in series with the second transistor 224b of the npn bipolar type.

A terminal of the mirror transistor 224b and the collector of the bipolar transistor 224b of the second leg are connected to the gate of the follower output transistor 218 at a node 232. Furthermore, the bases of the bipolar transistors 226a and 224b in the first and second legs are connected to the output node 222.

The bipolar transistors on the two branches of the current source have different emitter surface areas. Thus there is a difference in the base-emitter voltage for these transistors. In the circuit in FIG. 14, it is assumed that the bipolar transistor 226a in the first leg has a larger emitter area than the area of the bipolar transistor 224b in the second leg.

Let us denote the voltage difference between the base-emitter voltages $V_{BE}a$ and $V_{BE}b$ of the bipolar transistors 226a and 224b of the first and second legs respectively, as $\epsilon V_{BE}=V_{BE}a-V_{BE}b$. This voltage difference is transferred to the terminals of the emitter resistor 228 through which a current $I_a$ passes, such that $$I_a = \frac{\delta V_{BE}}{R_1},$$

where $R_1$ is the value of the resistance of the emitter 228. As a first approximation, it is estimated that the current $I_a$ corresponding to the emitter current in the bipolar transistor 226a in the first leg, is approximately equal to its collector current. The current $I_a$ is thus the current in the first leg 210a of the current source.

Mirror transistors 224a and 224b form a current mirror used to copy the current $I_a$ passing through the first pilot leg 210a into the second leg 210b. Denoting the current in the second leg 210b, i.e. approximately the emitter current in the bipolar transistor 224b, as $I_b$, and then $I_a \approx I_b$. The adjustment resistor 212 carries a current approximately equal to $I_a+I_b= 2I_a$. Thus the voltage $V_{GAP}$ may be expressed by $V_{GAP}= V_{BE}b+2R_2I_a$, where $V_{BE}b$ is the base-emitter voltage of the bipolar transistor 224b in the second leg, and $R_2$ is the value of the adjustment resistor 212.

Knowing that the voltage $V_{BE}b$ reduces linearly with the temperature and that the current $I_a$ increases linearly with the temperature, an appropriate choice of the value $R_2$ of the adjustment resistor 212 can keep the output voltage $V_{GAP}$ approximately constant and independent of the temperature. For example, it may be noted that the expression of $\epsilon V_{BE}$ as a function of the temperature T is such that $$\delta V_{BE} = \frac{KT}{q} \ln \frac{S_a}{S_b}.$$

In this formula, K is Boltzman's constant, q is the electron charge and $S_a$ and $S_b$ are the surface areas of the emitters of transistors 226a and 224b of the first and second legs respectively. Thus the current $I_a$ increases linearly with the temperature. For example, the value $R_2$ of the adjustment resistor is chosen such that the voltage $V_{GAP}$ is on the order of 1.2 V when the power supply voltage between the power supply terminals 214, 216 is on the order of 5 V.

The current source 210 is also used to control a charging current for capacitor 170 in the delay circuit (FIG. 9). In particular, the gate 176 of the mirror transistor 174 in the delay circuit is connected to the gate of the first transistor 224a in the first leg 210a (FIG. 14) of the current source. The first transistor in the first leg of the current source operates with the mirror transistor in the delay circuit, to form a current mirror.

That which is claimed is:

1. A monitoring device of a reset type for a power supply voltage, the monitoring device comprising:
   a constant voltage generator for outputting a reference voltage and having a transient condition when placed in operation;
   a comparator to compare the power supply voltage with the reference voltage output by said constant voltage generator and to control a state of an output terminal for the monitoring device; and
   a delay circuit to set the output terminal to a predetermined state for a predetermined duration after the monitoring device is switched on, the predetermined duration exceeding a duration of the transient condition when said constant voltage generator is placed in operation.

2. A monitoring device according to claim 1, wherein the transient condition of said constant voltage generator comprises an over-oscillation.

3. A monitoring device according to claim 1, wherein said delay circuit comprises a charging capacitor and a switching transistor connected to said charging capacitor.

4. A monitoring device according to claim 3, further comprising a charging circuit connected to said switching transistor.

5. A monitoring device according to claim 4, wherein said constant voltage generator comprises a current source; and wherein said charging circuit comprises a current mirror for copying current from the current source to charge said charging capacitor.

6. A monitoring device according to claim 3, wherein said switching transistor is in a blocked state when a charging voltage of said charging capacitor has reached a predetermined value.

7. A monitoring device according to claim 6, wherein the power supply voltage is about 5 volts; and wherein said switching transistor is in a blocked state when the capacitor charging voltage reaches about 2.5 volts.

8. A monitoring device according to claim 1, wherein said constant voltage generator comprises a band-gap constant voltage generator.

9. A monitoring device of a reset type for a power supply voltage, the monitoring device comprising:

a constant voltage generator for outputting a reference voltage and having a transient condition when placed in operation;

a comparator to compare the power supply voltage with the reference voltage output by said constant voltage generator and to control a state of an output terminal for the monitoring device; and a charging capacitor and a charging circuit therefor to set the output terminal to a predetermined state for a predetermined duration after the monitoring device is switched on, the predetermined duration exceeding a duration of the transient condition when said constant voltage generator is placed in operation.

10. A monitoring device according to claim 9, wherein the transient condition of said constant voltage generator comprises an over-oscillation.

11. A monitoring device according to claim 9, wherein said constant voltage generator comprises a current source; and wherein said charging circuit comprises a current mirror for copying current from the current source to charge said charging capacitor.

12. A monitoring device according to claim 9, wherein charging circuit comprises a switching transistor connected to said charging capacitor; and wherein said switching transistor is in a blocked state when a charging voltage of said charging capacitor has reached a predetermined value.

13. A monitoring device according to claim 12, wherein the power supply voltage is about 5 volts; and wherein said switching transistor is in a blocked state when the capacitor charging voltage reaches about 2.5 volts.

14. A monitoring device according to claim 9, wherein said constant voltage generator comprises a band-gap constant voltage generator.

15. A monitoring device of a reset type for a power supply voltage, the monitoring device comprising:

a constant voltage generator for outputting a reference voltage and having a transient condition when placed in operation;

a comparator to compare the power supply voltage with the reference voltage output by said constant voltage generator and to control a state of an output terminal for the monitoring device; and transient compensation means for causing the output terminal to be set to a predetermined state despite the transient condition of said constant voltage generator.

16. A monitoring device according to claim 15, wherein the transient condition of said constant voltage generator comprises an over-oscillation.

17. A monitoring device according to claim 15 wherein said transient compensation means comprises a delay circuit for setting the output terminal to a predetermined state for a predetermined duration after the monitoring device is switched on, the predetermined duration exceeding a duration of the transient condition of said constant voltage generator.

18. A monitoring device according to claim 17, wherein said delay circuit comprises a charging capacitor and a switching transistor connected to said charging capacitor.

19. A monitoring device according to claim 18, further comprising a charging circuit connected to said switching transistor.

20. A monitoring device according to claim 19, wherein said constant voltage generator comprises a current source; and wherein said charging circuit comprises a current mirror for copying current from the current source to charge said charging capacitor.

21. A monitoring device according to claim 18, wherein said switching transistor is in a blocked state when a charging voltage of said charging capacitor has reached a predetermined value.

22. A monitoring device according to claim 18, wherein the power supply voltage is about 5 volts; and wherein said switching transistor is in a blocked state when the capacitor charging voltage reaches about 2.5 volts.

23. A monitoring device according to claim 15, wherein said constant voltage generator comprises a band-gap constant voltage generator.

24. A method for operating a monitoring device of a reset type for a power supply voltage, the monitoring device comprising a constant voltage generator for outputting a reference voltage and having a transient condition when placed in operation, and a comparator to compare the power supply voltage with the reference voltage output by the constant voltage generator and to control a state of an output terminal for the monitoring device, the method comprising the step of:

compensating for the transient condition by causing the output terminal to be set to a predetermined state despite the transient condition of the constant voltage generator.

25. A method according to claim 24 wherein the step of compensating comprises setting the output terminal to a predetermined state for a predetermined duration after the monitoring device is switched on, the predetermined duration exceeding a duration of the transient condition of the constant voltage generator.

26. A method according to claim 25, wherein the step of setting the output terminal to a predetermined state comprises setting same to the predetermined state based upon a charging capacitor.

27. A method according to claim 26, wherein the constant voltage generator comprises a current source; and wherein the step of charging the capacitor comprises charging same using a current mirror for copying current from the current source.

* * * * *

UNITED STATES PATENT AND TRADEMARK OFFICE
CERTIFICATE OF CORRECTION

PATENT NO.     : 5,920,182
DATED          : July 6, 1999
INVENTOR(S)    : Paolo Migliavacca It is certified that error appears in the above-identified patent and that said Letters Patent is hereby corrected as shown below:

The Title page should be deleted and substitute therefor the attached Title page.

The drawing sheet, consisting of Fig. 8, should be
deleted to be replaced with the drawing sheet, consisting
of Fig. 8, as shown on the attached page.

Signed and Sealed this

Sixth Day of June, 2000

Attest:

Q. TODD DICKINSON

*Attesting Officer*     *Director of Patents and Trademarks*

UNITED STATES PATENT AND TRADEMARK OFFICE
CERTIFICATE OF CORRECTION

PATENT NO. : 5,920,182
DATED : July 6, 1999
INVENTOR(S) : MIGLIAVACCA

Page 2 of 4

It is certified that error appears in the above-identified patent and that said Letters Patent is hereby corrected as shown below:

FIG.8

United States Patent [19]
Migliavacca

[11] Patent Number: 5,920,182
[45] Date of Patent: Jul. 6, 1999

[54] "RESET" TYPE POWER SUPPLY VOLTAGE MONITORING DEVICE

[75] Inventor: Paolo Migliavacca, Sassenage, France

[73] Assignee: STMicroelectronics S.A., Gentilly, France

[21] Appl. No.: 09/129,145

[22] Filed: Aug. 5, 1998

[30] Foreign Application Priority Data

Aug. 21, 1997 [FR] France ................... 97 10551

[51] Int. Cl.$^6$ ................................................ G05F 1/565
[52] U.S. Cl. ........................................................ 323/282
[58] Field of Search ................................. 323/223, 226, 323/265, 266, 271, 273, 274, 282, 284

[56] References Cited

U.S. PATENT DOCUMENTS

| | | |
|---|---|---|
| 4,862,013 | 8/1989 | Konopka ................... 307/254 |
| 4,929,883 | 5/1990 | Chieli ....................... 323/282 |
| 5,224,010 | 6/1993 | Tran et al. . | |
| 5,477,176 | 12/1995 | Chang et al. . | |
| 5,818,214 | 10/1998 | Pelly et al. ................ 323/282 |

OTHER PUBLICATIONS

E. Haseloff, "TL7700 Voltage Supervisor," Microprocessors & Microsystems, vol. 11, No. 10, Dec. 1987, pp. 545–548.
R. Benzer, "What To Do When the Power Goes Out," Machine Design, vol. 63, No. 7, Apr. 11, 1991, pp. 62–63.

*Primary Examiner*—Matthew Nguyen
*Attorney, Agent, or Firm*—Allen, Dyer, Doppelt, Milbrath & Gilchrist, P.A.

[57] ABSTRACT

A power supply voltage monitoring device includes a constant voltage generator, a comparator to compare the power supply voltage with a reference voltage output by the constant voltage generator and to control the state of an output terminal. The device also comprises a delay circuit to put the output terminal into a predetermined state (low) for a predetermined duration exceeding the duration of the transient conditions, while the voltage generator is being put into operation. The power supply voltage monitoring device may typically be applied in microprocessor equipment.

27 Claims, 5 Drawing Sheets

UNITED STATES PATENT AND TRADEMARK OFFICE
CERTIFICATE OF CORRECTION

PATENT NO. : 5,920,182
DATED : July 6, 1999
INVENTOR(S) : MIGLIAVACCA

It is certified that error appears in the above-identified patent and that said Letters Patent is hereby corrected as shown below:

| | |
|---|---|
| Column 7 line 27 | strike: "224$b$"<br>insert: --226$b$-- |
| Column 7 line 31 | strike "224$b$"<br>insert --226$b$-- |
| Column 7 line 38 | strike: "224$b$"<br>insert: --226$b$-- |
| Column 7 line 41 | strike: "224$b$"<br>insert: --226$b$-- |
| Column 7 line 42 | strike: "$\epsilon$"<br>insert: --$\delta$-- |
| Column 7 line 60 | strike: "224$b$"<br>insert: --226$b$-- |
| Column 7 line 64 | strike: "224$b$"<br>insert: --226$b$-- |
| Column 8 line 4 | strike: "$\epsilon$"<br>insert: --$\delta$-- |
| Column 8 line 13 | strike: "224$b$"<br>insert: --226$b$-- |